ved sept. 25, 1962

3,055,327
METAL WORKING

Claus L. Sporck, Cincinnati, Ohio, assignor to The Lodge & Shipley Company, Cincinnati, Ohio, a corporation of Ohio
Filed Sept. 23, 1955, Ser. No. 536,086
5 Claims. (Cl. 113—52)

This invention relates to the art of metal-working and, in particular, relates to the forming or shaping of hollow articles from sheet metal stock.

The methods disclosed herein may be carried out in connection with machines such as shown in copending applications of Claus L. Sporck and Bernard Sassen, Serial Nos. 454,871 and 490,792, respectively filed September 9, 1954, and February 28, 1955.

The term "hollow" as used herein will be understood to apply to an article which is generally frusto-conical in shape, and is meant to include an article, a section of which is shaped as above mentioned. Also, it will be understood that the term "sheet metal" is inclusive of plate or plate-like elements, even when formd as forgings, castings, weldments or the like.

In general, the present invention contemplates improved methods for the forming of a hollow article, the sides of which are tapered and have a grain structure arranged in a generally helical manner. Such articles formed by the methods of the invention have a wide variety of industrial uses. For example, in automobile wheels the grain structure provides highly desirable strength characteristics, while the taper affords a reduction in weight and in gyroscopic effects.

According to one aspect of the invention, a hollow article is made by first forming a blank having an annular portion of tapering cross section, supporting the blank on a spindle having a conical-shaped forming surface and then, while the spindle and the blank are rotating, causing a roller to engage the annular portion and move in a path non-parallel to the surface of the spindle so that the thickness of the side being formed taken in a direction generally parallel to the rotational axis of the spindle is equal to the corresponding thickness of the original blank.

According to another aspect of the invention, a hollow article is made by first forming a generally cup-shaped blank having a conical portion, the side of which is tapered, supporting the blank on a spindle having a conical-shaped forming surface and then, while the spindle and blank are rotating, causing a roller to engage the conical portion of the blank and move in a path non-parallel to the surface of the spindle so that the thickness of the side of the article being formed taken in a direction parallel to the rotational axis of the spindle is equal to the corresponding thickness of the conical-shaped portion in the original blank.

The preferred manner in which the methods of the invention are carried out will be described in connection with the following description and drawings wherein.

Figure 1:
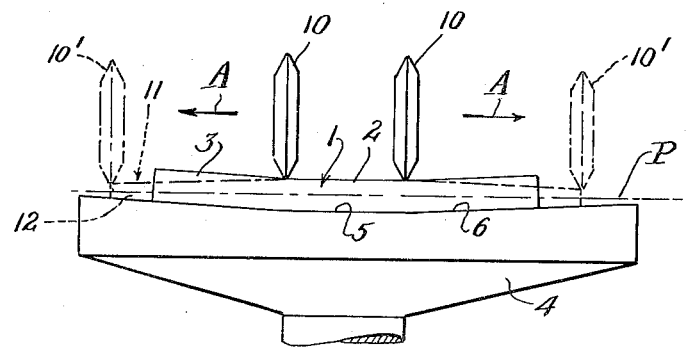
FIGURE 1 is a view showing a typical manner of forming a blank to be subsequently worked into a conical-shaped article having tapering sides of helical grain structure.

In FIGURE 1 a generally cup-shaped blank 1 has a generally flat center section 2 and a side 3 of a known included angle. The blank is mounted on an arbor 4 having a flat center section 5 cooperating with the center section 2 of the blank and a conical-shaped portion 6 whose included angle is equal to that of the portion 3 of the blank and cooperates therewith. The arbor 4 is adapted to be rotated and the blank may, if desired, be clamped thereto by means not shown cooperating with the center section 2. A pair of rollers 10—10 are arranged to be positioned as shown at the intersection between the portions 2 and 3 of the blank and then moved outwardly radially as indicated by the arrows A to the position indicated at 10'—10'. The movement of the rollers outwardly displaces the metal in the portion 3 of the blank 1 to elongate and reduce the same so as to form a blank 11 having an annular portion 12 of tapering cross section decreasing in thickness in a direction away from the center of the blank. The taper of portion 6 of the arbor 4 and the working path of the rollers are arranged so that the taper of the portion 12 of the blank 11 is substantially uniform about the plane of the blank generally indicated by the dotted line P.

The blank 11 is then placed on a spindle 13 arranged in an operating machine such as shown in the above-mentioned copending applications. The spindle is adapted to be rotated and the blank 11 may be clamped on the spindle as by a tailstock or the like. The spindle has a generally conical-shaped working portion or surface 14.

With the spindle and blank rotating, a roller 15 is made to engage the blank and then move in a path non-parallel to the surface of the spindle to the position indicated by 15', the path of the roller being indicated by the dotted line 16. The effect of the roller movement is to axially displace the metal in the conical-shaped portion 12 of the blank and work the same against the spindle so as to form tapered sides 20 in the article 21.

The movement of the roller non-parallel to the surface of the spindle is accomplished in a manner which forms an important part of the invention. The roller is moved along the surface so that it is always spaced therefrom, in a direction parallel to the rotational axis of the spindle, a distance $d$ which is equal to the corresponding thickness $t$ of the original blank, also taken in a direction parallel to the axis R and at a radial distance from the axis the same as $d$. The same obtains for any other position of the roller, for example, as indicated at $d'$ and $t'$. Thus, it will be apparent that the thickness of the side formed taken at any point thereon in a direction generally parallel to the rotational axis of the spindle is equal to the corresponding thickness of the original blank.

By so moving the roller, true axial displacement is obtained. For example, if it is assumed that the blank is made up of parallel strata, the movement of the roller as above described will cause the strata to remain parallel to one another as the blank is displaced into the article.

If the roller is made to move non-parallel to the spindle so that the distances $d$—$d'$ are less than the thicknesses $t$—$t'$, then the metal may be swedged but not truly displaced. While swedging may be accomplished in a hot working operation, it is virtually impossible to swedge and obtain a high degree of taper in cold working, particularly because of the supporting bearing versus required force problems.

The cooperative action between the rotation of the blank and the movement of the roller causes the grain structure to be oriented generally in a helical manner, that is, a helix whose axis generally corresponds to the rotational axis R. This formation of the grain structure greatly increases the strength of the article. A typical example of grain structure of the kind in question is shown in the above-mentioned copending application Serial No. 490,792.

An important point to note here is that the taper of the original blank 11 and the taper of the article 21 both extend in the same direction, i.e., both decrease in a direction away from the center of the blank or the article. When an article to be made is to have a side whose taper increases in a direction away from the center, the original blank must have the same type of taper and the roller made to follow a path so that the thickness of the side formed taken at any point thereon in a direction generally parallel to the rotational axis of the spindle is equal to the corresponding thickness of the original blank.

Figure 2:
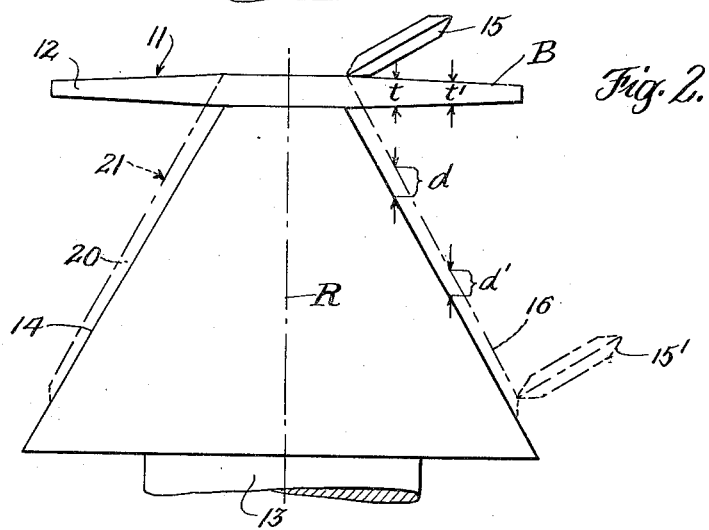
FIGURE 2 is a view showing the manner in which the blank of FIGURE 1 is mounted on a spindle and then worked by a roller into the desired hollow article.
Figure 3:
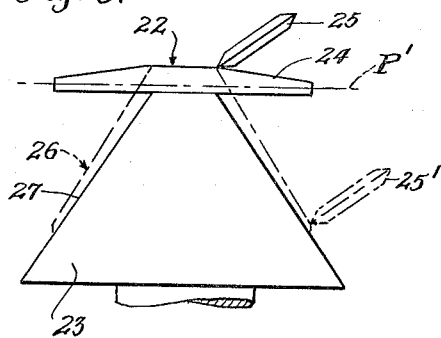
FIGURE 3 is a view showing the manner in which a blank having non-symmetrical taper is mounted on a spindle and worked by a roller into the desired hollow article.

In FIGURE 3 I have shown a blank 22 mounted on a spindle 23, the blank having an annular portion 24 of tapering cross section, the taper being non-symmetrical with respect to the plane P' of the blank. With the blank and spindle rotating, a roller 25 is made to engage the blank at the position shown and move to the position shown at 25' to form the article 26. The roller is made to move as described in connection with FIGURE 2 so that the blank is axially displaced to form the side 27 of the article with tapering cross section and helical grain structure.

Figure 4:
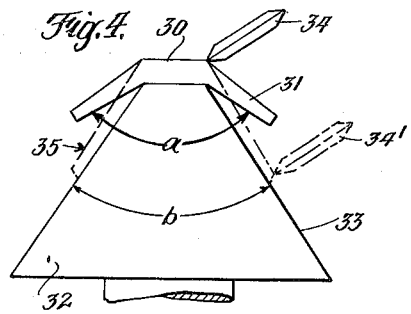
FIGURE 4 is a view showing the manner in which a cup-shaped blank having a conical-shaped portion whose sides are tapered is mounted on a spindle and worked by a roller into the desired hollow article.

In FIGURE 4 I have shown a generally cup-shaped blank 30 having a conical portion 31 of known included angle $a$ and a taper which decreases in a direction away from the center of the blank. The blank is mounted on a spindle 32 having a conical-shaped portion 33 whose included angle $b$ is smaller than the included angle $a$. With the blank and spindle rotating, a roller 34 is made to engage the blank at the position shown and then move in the manner described to the position indicated at 34' to form the article 35 having a tapered side of helical grain structure.

I claim:

1. The method of making a hollow generally conical-shaped article having a tapered side comprising the steps: working a blank having an annular portion of tapering cross by mounting said blank on a spindle having a conical-shaped portion and while the spindle and blank are rotating, axially displacing said annular portion by making a roller move in a path non-parallel to the surface of the conical-shaped portion of the spindle so that the thickness of the side being formed taken at any point thereon in a direction generally parallel to the rotational axis of the spindle is equal to the corresponding thickness of the original blank.

2. The method of claim 1 wherein the annular portion of said blank has a taper decreasing in thickness in a direction away from the center of the blank.

3. The method of making a hollow generally conical-shaped article having a tapered side comprising the steps: working a blank having an annular portion of tapering cross section, the taper being symmetrical about the central plane of the blank by mounting said blank on a spindle having a conical-shaped portion and while the spindle and blank are rotating, axially displacing said annular portion by making a roller move in a path non-parallel to the surface of the conical-shaped portion of the spindle so that the thickness of the side being formed taken at any point thereon in a direction generally parallel to the rotational axis of the spindle is equal to the corresponding thickness of the original blank.

4. The method of making a hollow generally conical-shaped article having a tapered side comprising the steps: making a generally cup-shaped blank having a side of known included angle; using a generally cup-shaped arbor having a conical portion of the same included angle as said side and a roller, displacing said side to form a second blank having an annular portion of tapering cross section decreasing in thickness in a direction away from the center of the blank; and placing said blank on a spindle having a conical-shaped portion and while the spindle and blank are rotating, axially displacing said annular portion by making a roller move in a path non-parallel to the surface of the spindle so that the thickness of the side being formed taken at any point thereon in a direction generally parallel to the rotational axis of the spindle is equal to the corresponding thickness of the original blank whereby the side of the article has a tapered cross section decreasing towards the mouth thereof.

5. The method of making a hollow generally conical-shaped article having tapered sides comprising the steps: working a generally cup-shaped blank having a conical portion of known included angle, the side of the portion having a taper decreasing in a direction away from the center of the blank by mounting said blank on a spindle having a conical-shaped portion of included angle less than first said included angle and while the spindle and the blank are rotating, axially displacing the conical portion of the blank by making a roller move in a path non-parallel to the surface of the conical-shaped portion of the spindle so that the thickness of the side being formed taken at any point thereon in a direction generally parallel to the rotational axis of the spindle is equal to the corresponding thickness of the original blank.

References Cited in the file of this patent

UNITED STATES PATENTS

| Re. 19,790 | Lindgren | Dec. 17, 1935 |
| 438,406 | Dewey | Oct. 14, 1890 |
| 1,120,371 | Buescher | Dec. 8, 1914 |
| 1,901,035 | Kelley et al. | Mar. 14, 1933 |

FOREIGN PATENTS

| 344,473 | Great Britain | Mar. 4, 1931 |
| 436,768 | Great Britain | Oct. 17, 1935 |